(12) United States Patent
Jo

(10) Patent No.: US 11,265,626 B2
(45) Date of Patent: Mar. 1, 2022

(54) APPARATUS AND METHOD FOR CONNECTING WIRELESS SENSOR

(71) Applicants: Hyundai Motor Company, Seoul (KR); Kia Motors Corporation, Seoul (KR)

(72) Inventor: Sun-Myoung Jo, Yeoju-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 16/897,944

(22) Filed: Jun. 10, 2020

(65) Prior Publication Data
US 2020/0304891 A1   Sep. 24, 2020

Related U.S. Application Data

(62) Division of application No. 16/188,831, filed on Nov. 13, 2018, now Pat. No. 10,869,109.

(30) Foreign Application Priority Data

Mar. 22, 2018  (KR) .................. 10-2018-0033394

(51) Int. Cl.
*G07C 5/08* (2006.01)
*G07C 5/00* (2006.01)
*H04Q 9/00* (2006.01)
*H02J 7/34* (2006.01)

(52) U.S. Cl.
CPC .............. *H04Q 9/00* (2013.01); *G07C 5/008* (2013.01); *H02J 7/34* (2013.01); *H04Q 2209/84* (2013.01); *H04Q 2209/88* (2013.01)

(58) Field of Classification Search
None
See application file for complete search history.

(56) References Cited

U.S. PATENT DOCUMENTS

| | | | | |
|---|---|---|---|---|
| 6,073,459 A | * | 6/2000 | Iritani | F25B 41/20 |
| | | | | 62/204 |
| 2004/0148083 A1 | * | 7/2004 | Arakawa | G07C 5/085 |
| | | | | 701/50 |
| 2005/0285569 A1 | * | 12/2005 | Rao | B60C 23/0411 |
| | | | | 320/128 |
| 2010/0066521 A1 | * | 3/2010 | Yoshida | B60C 23/0408 |
| | | | | 340/438 |
| 2011/0188392 A1 | * | 8/2011 | Misumi | H04Q 9/00 |
| | | | | 370/252 |

(Continued)

FOREIGN PATENT DOCUMENTS

| JP | 2009-251876 A | 10/2009 |
|---|---|---|
| JP | 2014-67110 A | 4/2014 |

(Continued)

*Primary Examiner* — Curtis A Kuntz
*Assistant Examiner* — Jerold B Murphy
(74) *Attorney, Agent, or Firm* — Morgan, Lewis & Bockius LLP

(57) ABSTRACT

An apparatus for connecting a wireless sensor may include a charging battery which is self-powered, a measurement sensor configured for performing wireless communication and receive power from the charging battery, and a vehicle controller configured to be connected to the measurement sensor through wireless communication and receive measured data.

9 Claims, 5 Drawing Sheets

(56) References Cited

U.S. PATENT DOCUMENTS

| | | |
|---|---|---|
| 2012/0089299 A1 | 4/2012 | Breed |
| 2013/0054084 A1* | 2/2013 | Kosugi ............... B60C 23/0481 701/34.4 |
| 2013/0169442 A1 | 7/2013 | Ruocco |
| 2016/0112216 A1 | 4/2016 | Sargent |
| 2020/0258326 A1* | 8/2020 | Luo ................... B60C 23/0471 |

FOREIGN PATENT DOCUMENTS

| | | |
|---|---|---|
| KR | 10-2013-0067453 A | 6/2013 |
| KR | 10-1275287 B1 | 6/2013 |
| KR | 10-2016-0108204 A | 9/2016 |
| KR | 10-2016-0135918 A | 11/2016 |
| KR | 10-2017-0125039 A | 11/2017 |

* cited by examiner

APPARATUS AND METHOD FOR CONNECTING WIRELESS SENSOR

CROSS-REFERENCE TO RELATED APPLICATION

The present application is a Divisional of U.S. patent application Ser. No. 16/188,831, filed Nov. 13, 2018, which claims priority to Korean Patent Application No. 10-2018-0033394 filed Mar. 22, 2018, the entire contents of which are incorporated herein for all purposes by these references.

BACKGROUND OF THE INVENTION

Field of the Invention

The present invention relates to a wireless sensor connection technique. More particularly, the present invention relates to an apparatus and a method for connecting a wireless sensor disposed at an engine of an engine compartment and controlling the engine through the connected wireless sensor.

Description of Related Art

All sensors disposed in an engine compartment are connected to an engine control unit (ECU) through lots of wires and connectors. The ECU processes input information to control an engine.

However, following the trends of engine downsizing and/or development of a high performance vehicle, electric components for controlling an engine are being added. Furthermore, owing to addition of electric components for the development of a control technique and an increase of wires, deterioration in environmental condition of an engine compartment is ongoing.

Furthermore, there is a limitation on a specific network construction for use in a harsh environmental condition such as an engine compartment.

Moreover, transmission data is transmitted by being modulated through a motor control unit (MCU), and thus it is difficult to utilize an ECU logic.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing an apparatus and a method for connecting a wireless sensor, which are configured for constructing a wireless sensor network system in an engine compartment to allow the wireless sensor network system to be usable even under a harsh environmental condition.

Furthermore, an exemplary embodiment of the present invention is directed to an apparatus and a method for connecting a wireless sensor, which are configured for transmitting a detected value to a value which is being received by an engine control unit (ECU) to allow an existing logic of the ECU to be utilized.

Furthermore, an exemplary embodiment of the present invention is directed to an apparatus and a method for connecting a wireless sensor, which are configured for constructing a complete wireless sensor network by removing a wire of a battery from a wireless sensor.

Moreover, an exemplary embodiment of the present invention is directed to an apparatus and a method for connecting a wireless sensor, which are configured for specifying a vehicle operation logic when a communication error is caused by hardware (H/W) and communication disturbance during transmission wireless data.

Other objects and advantages of the present invention may be understood by the following description and become apparent with reference to the exemplary embodiments of the present invention. Also, it is obvious to those skilled in the art to which the present invention pertains that the objects and advantages of the present invention may be realized by the means as claimed and combinations thereof.

Provided herein are an apparatus and a method for connecting a wireless sensor, which are configured for constructing a wireless sensor network system in an engine compartment to allow the wireless sensor network system to be usable even under a harsh environmental condition.

In accordance with various exemplary embodiments of the present invention, an apparatus configured for connecting a wireless sensor may include a charging battery which is self-powered, a measurement sensor configured for performing wireless communication and receive power from the charging battery, and a vehicle controller configured to be connected to the measurement sensor through wireless communication and receive measured data.

The apparatus may further include a power converter configured to perform self-charging to charge the charging battery.

The power converter may be a piezoelectric element using vibration generated during engine starting or may be a thermoelectric element using thermal energy generated during the engine starting.

The measurement sensor may include a wireless transmission circuit.

The power converter, the wireless transmission circuit, and the charging battery may be directly connected to a measurement sensor body.

Alternatively, the power converter, the wireless transmission circuit, and the charging battery may be connected to a measurement sensor body through wires.

The wireless transmission circuit may receive an assigned identification.

The measurement sensor may have a vent hole for robustness against humidity.

The vehicle controller may maintain a continuous repairing attempt with respect to the measurement sensor and may store counting information on the number of times of the repairing attempt in a memory.

When an error does not occur in the measured data, the vehicle controller may store a failure code for a measurement target component of a vehicle in the memory.

In accordance with various exemplary embodiments of the present invention, a method for connecting a wireless sensor may include performing self-charging on a charging battery, allowing a measurement sensor, which is configured for performing wireless communication, to receive power from the charging battery, and connecting a vehicle controller to the measurement sensor through wireless communication and receiving, by the vehicle controller, measured data.

The performing of the self-charging may include performing self-charging by a power converter and charging the charging battery.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
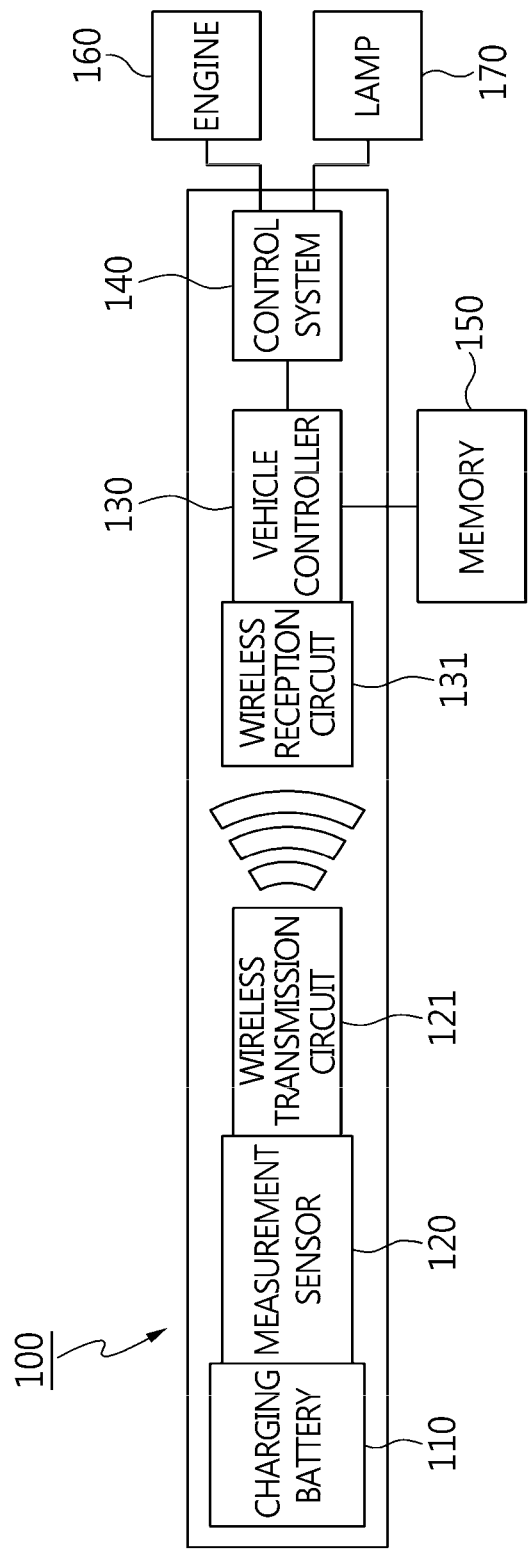
FIG. 1 is a configurational block diagram of a wireless sensor connection apparatus according to an exemplary embodiment of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

The present invention may be modified into various forms and may have a variety of embodiments, and, therefore, specific embodiments will be illustrated in the drawings and described in detail. The embodiments, however, are not to be taken in a sense which limits the present invention to the specific embodiments, and may be construed to include modifications, equivalents, or substitutes within the spirit and technical scope of the present invention.

In describing each drawing, similar reference numerals are assigned similar components. Although the terms "first," "second," and the like may be used herein to describe various components, these components should not be limited by these terms. The terms are used only for the purpose of distinguishing one component from another component.

For example, without departing from the scope of the present invention, a first component may be referred to as a second component, and similarly, a second component may also be referred to as a first component. The term "and/or" includes a combination of a plurality of related listed items or any item of the plurality of related listed items.

Unless otherwise defined, all terms including technical or scientific terms used herein have the same meaning as commonly understood by those skilled in the art to which the present invention pertains.

General terms that are defined in a dictionary shall be construed to have meanings that are consistent in the context of the relevant art and should not be interpreted as having an idealistic or excessively formalistic meaning unless clearly defined in the present disclosure.

Hereinafter, an apparatus and a method for connecting a wireless sensor according to an exemplary embodiment of the present invention will be described in detail with reference to the accompanying drawings.

FIG. 1 is a configurational block diagram of a wireless sensor connection apparatus 100 according to an exemplary embodiment of the present invention. Referring to FIG. 1, the wireless sensor connection apparatus 100 may include a charging battery 110 configured to be self-charged, a measurement sensor 120 configured to receive power from the charging battery 110, a vehicle controller 130 configured to receive measured data from the measurement sensor 120, and a control system 140 configured to perform control under the control of the vehicle controller 130.

The charging battery 110 is a chargeable secondary cell. The charging battery 110 may be a nickel metal battery cell, a lithium ion battery cell, a lithium polymer battery cell, a solid state battery cell, or the like.

The measurement sensor 120 receives power from the charging battery 110, performs measurement by being disposed at an engine compartment of a vehicle, generates measured data. Examples of installation positions of the measurement sensor 120 may include an intake system, a cylinder head, a cylinder block, an exhaust system, a transmission, and the like. An air temperature sensor (ATS), a manifold absolute pressure (MAP) sensor, a barometric pressure sensor (BPS), and the like are disposed at the intake system, a camp shaft position (CMP) sensor, a water temperature sensor (WTS), and the like are disposed at the cylinder head, an oil pressure sensor (OPS), an oil level sensor (OLS), and the like are disposed at the cylinder block, and an oxygen sensor, an exhaust gas temperature sensor, and the like are disposed at the exhaust system. Alternatively, the measurement sensor 120 may be disposed inside or outside the vehicle in addition to the engine compartment.

A wireless transmission circuit 121 may be configured at the measurement sensor 120 to transmit measured data to the vehicle controller 130. The wireless transmission circuit 121 receives an assigned identification. That is, a plurality of measurement sensors 120 may be formed, and identification may be added to measured data which is generated and transmitted from each of the plurality of measurement sensors 120 to distinguish the measured data.

The vehicle controller 130 analyzes the measured data transmitted from the measurement sensor 120 and performs control corresponding to the analysis result. Accordingly, a wireless reception circuit 131 is also configured at the vehicle controller 130, and a microprocessor and a memory 150 are configured to store and process the measured data.

The memory 150 may store a program and data which analyze the measured data and control corresponding vehicle parts according to the analysis result.

The memory 150 may be a memory provided in the vehicle controller 130 or may be a separate memory. Accordingly, the memory 150 may include at least one type of storage medium from among a flash type memory, a hard disk type memory, a multimedia card micro type memory, a card type memory (e.g., a secure digital (SD) or extreme digital (XD) memory), a random access memory (RAM), a static random access memory (SRAM), a read only memory (ROM), an electrically erasable programmable read only memory (EEPROM), a programmable read only memory (PROM), a magnetic memory, a magnetic disk, and an optical disk. The memory 150 may be operated in association with a web storage or a cloud server which performs a storage function of a storage portion on the Internet.

The control system 140 controls corresponding components disposed at the vehicle under the control of the vehicle controller 130. Examples of the control system 140 may include a hydraulic actuator, an electronic actuator, a drive circuit, and the like. Furthermore, examples of the corresponding components may include an engine 160 and a lamp 170.

Examples of the engine 160 may include a continuous variable valve timing (CVVT) engine, a double over head camshaft (DOHC) engine, a continuous valve timing (CAT) engine, a gasoline direct injection (GAI) engine, and a multi-point injection (MPI) engine, each of which utilizes gasoline as fuel, a common rail direct injection (CRDI) engine, a high direction turbo intercooler (HTI) engine, and a variable geometry turbocharge (VGT) engine, each of which utilizes diesel as fuel, and a liquid propane injection (LPI) engine using gas as a fuel.

Figure 2:
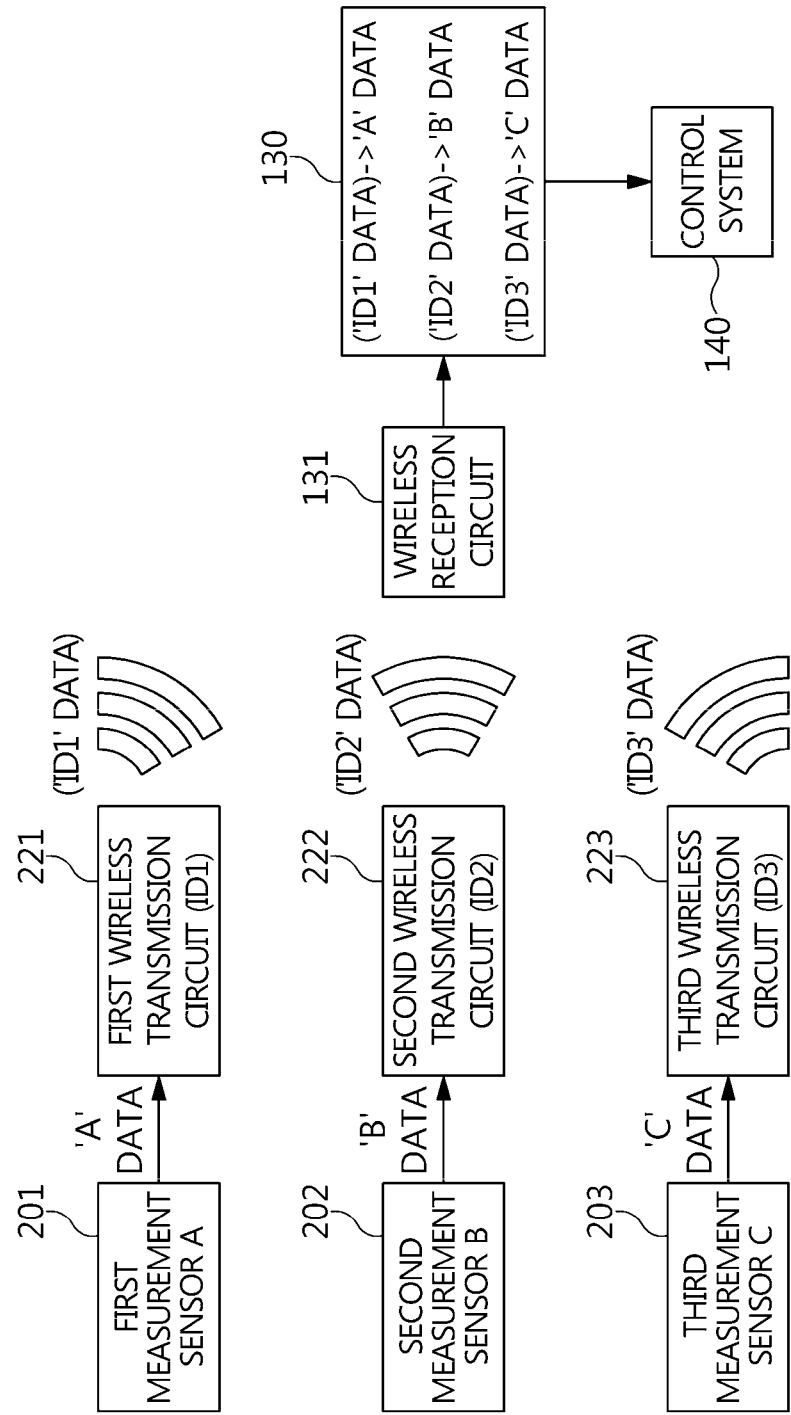
FIG. 2 is a conceptual diagram of transmission of detected data according to an exemplary embodiment of the present invention.

FIG. 2 is a conceptual diagram of transmission of detected data according to an exemplary embodiment of the present invention. Referring to FIG. 2, first to third measurement sensors 201, 202, and 203 are configured, and first to third wireless transmission circuits 221, 222, and 223 are respectively configured at the first to third measurement sensors 201, 202, and 203. The first wireless transmission circuit 221 is configured at the first measurement sensor 201, the second wireless transmission circuit 222 is configured at the second measurement sensor 202, and the third wireless transmission circuit 223 is configured at the third measurement sensor 203. Accordingly, when measured data 'A' DATA, 'B' DATA, and 'C' DATA generated by the first to third measurement sensors 201, 202, and 203 are transmitted to the first to third wireless transmission circuits 221, 222, and 223, the first to third wireless transmission circuits 221, 222, and 223 transmit data packets 'ID1' DATA, 'ID2' DATA, and 'ID3' DATA to which identifications (IDs) 'ID1,' 'ID2,' and 'ID3' of the first to third wireless transmission circuits 221, 222, and 223 to the wireless reception circuit 131.

The vehicle controller 130 processes the data packets 'ID1' DATA, 'ID2' DATA, and 'ID3' DATA by matching the data packets 'ID1' DATA, 'ID2' DATA, and 'ID3' DATA to existing measured data 'A' DATA, 'B' DATA, and 'C' DATA. Accordingly, the vehicle controller 130 may distinguish detected values generated by the first to third measurement sensors 201, 202, and 203 through the IDs assigned to the first to third wireless transmission circuits 221, 222, and 223 of the first to third measurement sensors 201, 202, and 203 and may use current control data by matching data of ID values, which are wirelessly transmitted, to sensor data of existing logics.

Figure 3:
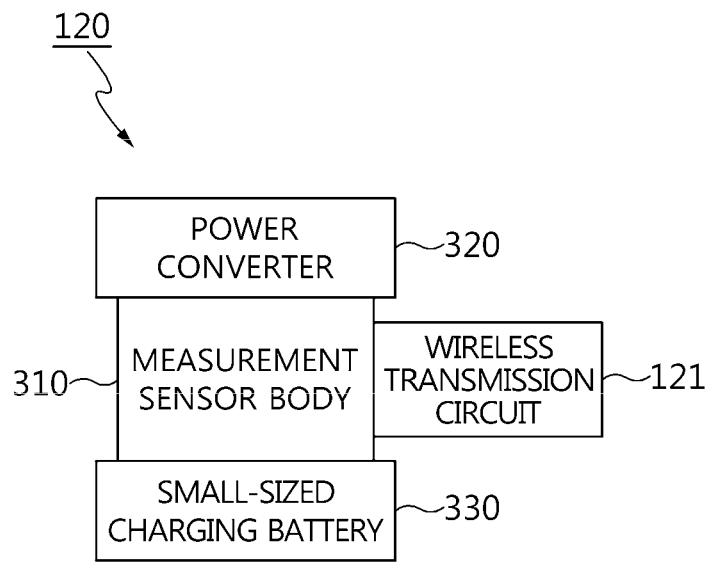
FIG. 3 is a detailed configuration example of a measurement sensor according to an exemplary embodiment of the present invention.

FIG. 3 is a detailed configuration example of the measurement sensor 120 according to an exemplary embodiment of the present invention. Referring to FIG. 3, a power converter 320, the wireless transmission circuit 121, and a small-sized charging battery 330 are directly connected to a measurement sensor body 310. The power converter 320 may be a piezoelectric element configured to generate power using vibration generated during engine starting. Alternatively, the power converter 320 may be a thermoelectric element configured to generate power using thermal energy generated during engine starting.

The power converter 320 may be self-powered by mounting thereon a piezoelectric energy harvesting device and a thermoelectric energy harvesting device. The piezoelectric energy harvesting device converts kinetic energy (e.g., vibration) generated at various positions of the engine into electric energy. The thermoelectric energy harvesting device converts thermal energy inside an engine room into electric energy. The power converter 320 is configured to supply charging power to the small-sized charging battery 330 to allow the measurement sensor 120 to be self-operated. The small-sized charging battery 330 is operated by receiving self-charged power without using other power source in the vehicle. Therefore, the measurement sensor 120 may be freely disposed independent from the vehicle controller 130 and a power source of the vehicle.

Figure 4:
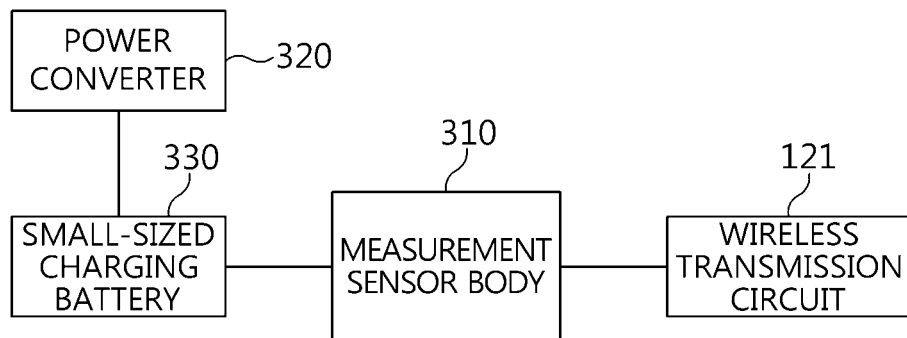
FIG. 4 is a detailed configuration example of a measurement sensor according to various exemplary embodiments of the present invention.

FIG. 4 is a detailed configuration example of a measurement sensor according to various exemplary embodiments of the present invention. An engine compartment has environments of a high temperature, a low temperature, and high vibration. Therefore, durability of a wireless transmission circuit, a charging battery, and the like tends to deteriorate. Therefore, to prevent durability deterioration, it is necessary to dispose these components at a distance from the measurement sensor. Referring to FIG. 4, the wireless transmission circuit 121, the small-sized charging battery 330, and the power converter 320 are connected to the measurement sensor body 310 through wires. That is, when a heat source is used, the small-sized charging battery 330, the wireless transmission circuit 121, and the power converter 320 are disposed at positions suitable for operating temperature conditions. In the instant case, a length of each of the wires may be varied. Even when vibration is used, the small-sized charging battery 330, the wireless transmission circuit 121, and the power converter 320 are disposed at positions suitable for vibration conditions.

In the presence of humidity, the measurement sensor body 310 is configured in a waterproof structure. That is, the waterproof structure may be achieved by performing waterproof treatment on an external plate of the measurement sensor body 310 for preventing a water leak. Furthermore, a vent hole 315 may be formed to discharging air, water, or the like. Consequently, robustness against humidity may be secured.

The configuration shown in FIG. 3 or FIG. 4 may be selectively applied according to an environmental condition.

Figure 5:
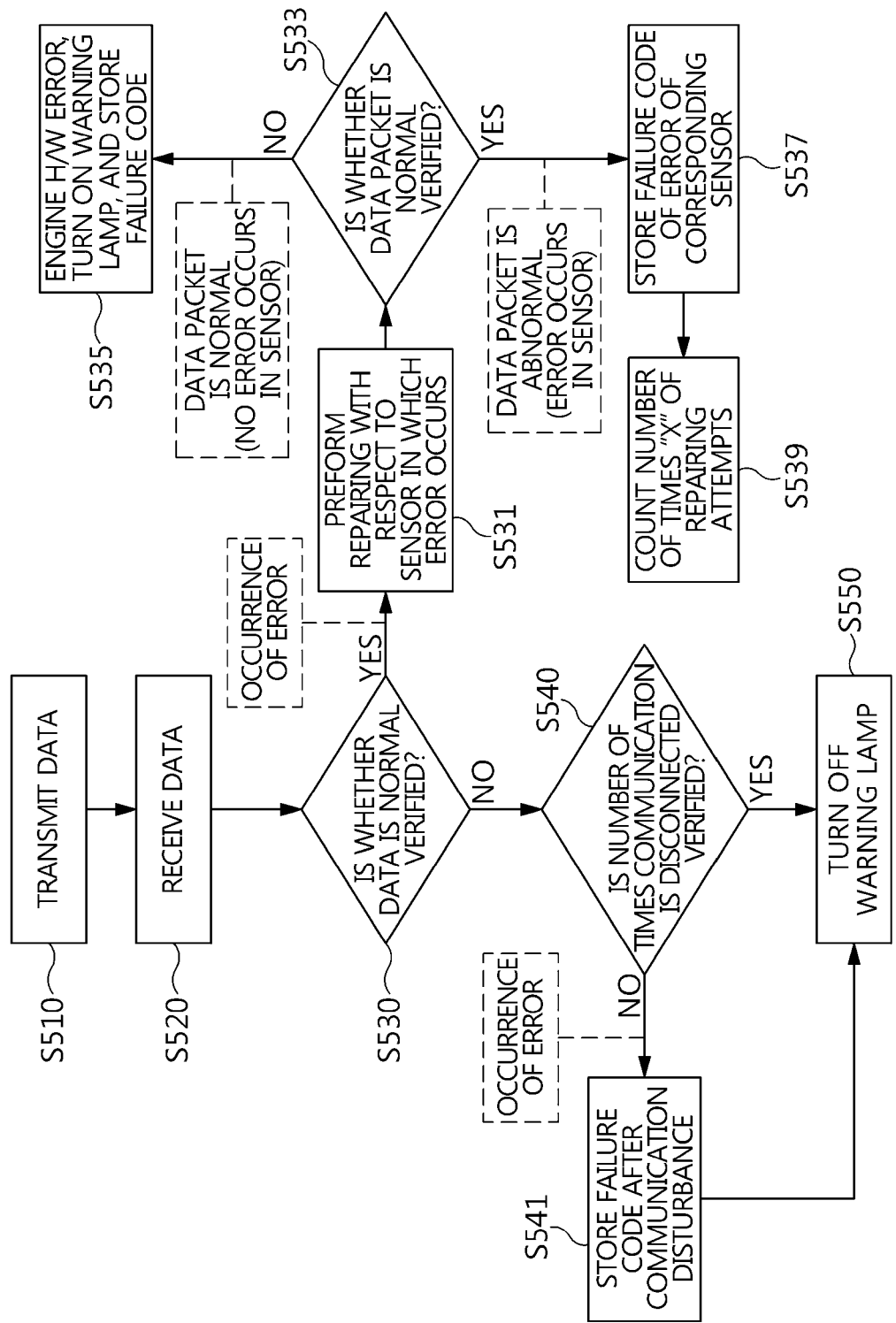
FIG. 5 is a flowchart for describing a control process of communication restoration when a communication error occurs according to an exemplary embodiment of the present invention.

FIG. 5 is a flowchart for describing a control process of communication restoration when a communication error occurs according to an exemplary embodiment of the present invention. Referring to FIG. 5, when the measurement sensor 120 of FIG. 1 transmits measured data (S510), the vehicle controller 130 receives the transmitted data (S520).

Thereafter, the vehicle controller 130 verifies whether the received data is normal S530). The vehicle controller 130 verifies whether an error occurs in the measurement sensor 120. This error may be resulting from hardware of the measurement sensor 120 or communication disturbance.

When communication disturbance occurs, an abnormal packet may be generated and data may be incorrectly modulated.

As the verification result in the operation S530, when an error is determined as occurring in the data, the vehicle controller 130 performs repairing which is performed with respect to the measurement sensor 120 in which the error occurs (S531) and verifies whether a data packet is normal (S533). As the verification result in the operation S533, when the data packet is determined as being normal, the vehicle controller 130 determines the error resulting from engine hardware and stores the error as a failure code (S535). At the present point, a warning lamp on a cluster may be lit.

On the other hand, when the data packet is determined as being abnormal in the operation S533, the vehicle controller 130 determines the abnormality resulting from the measurement sensor 120 and stores the abnormality as a failure code (S537). Thereafter, the vehicle controller 130 counts the number of times of repairing and proceeds to the operation S530. At the present point, counting information on the number of times of repairing is also stored in the memory 150 in FIG. 1.

Meanwhile, as the verification result in the operation S530, when the error is determined as not occurring in the data, the vehicle controller 130 verifies the number of times communication is disconnected (S540). As the verification result in the operation S540, when the number of times the communication is disconnected is determined as being within a predetermined reference value, the vehicle controller 130 turns off the warning lamp (S550). On the other hand, when the number of times the communication is disconnected is determined as being out of the predetermined reference value in the operation S540, the vehicle controller 130 attempts communication restoration and stores the present attempt as a failure mode (S541).

Figure 6:
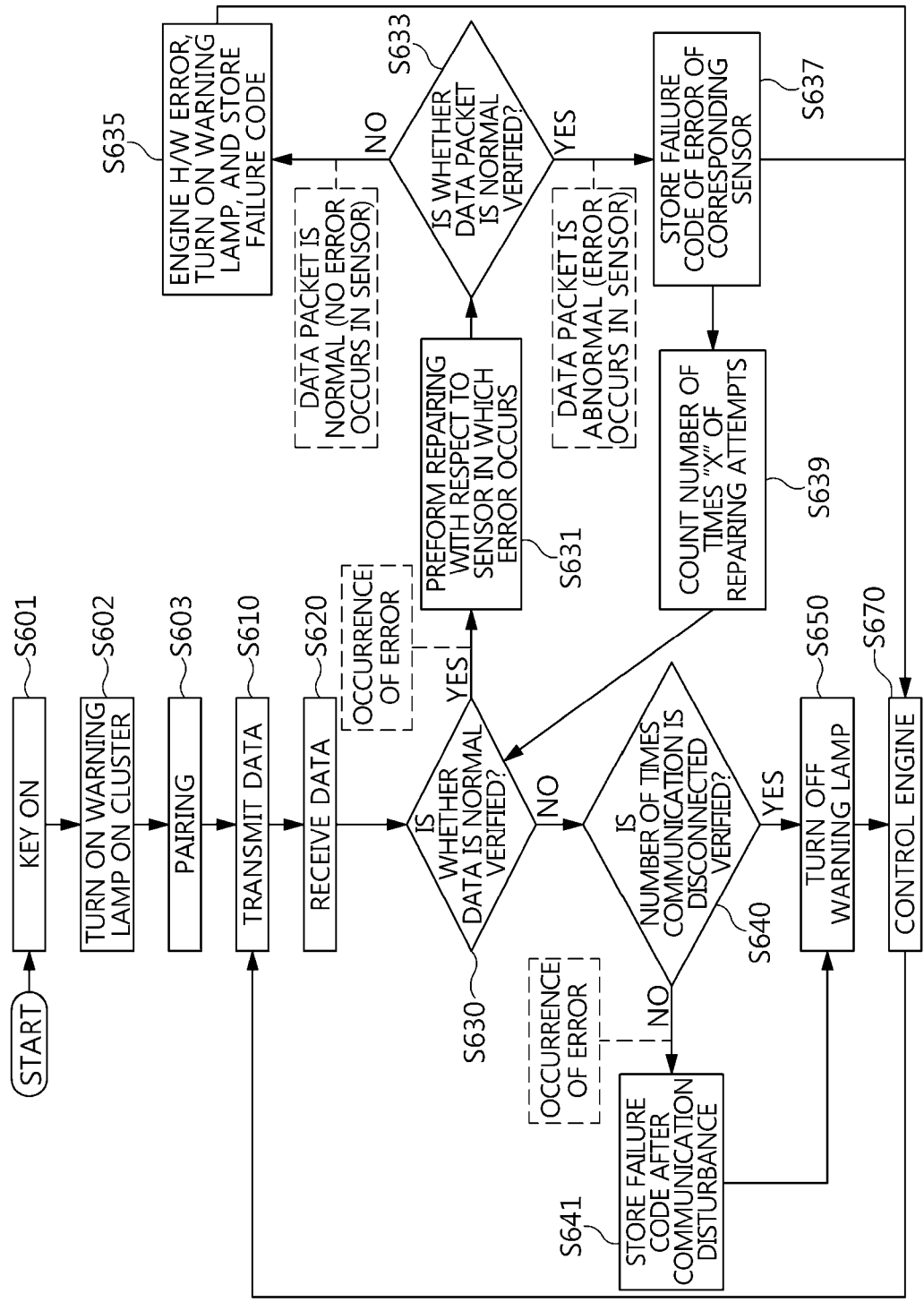
FIG. 6 is a flowchart for describing a control process of communication restoration when a communication error occurs according to various exemplary embodiments of the present invention.

FIG. 6 is a flowchart for describing a control process of communication restoration when a communication error occurs according to various exemplary embodiments of the present invention. Referring to FIG. 6, when a starting key of a vehicle is turned on (S601), a warning lamp on a cluster is turned on (S602).

Thereafter, pairing between each of measurement sensors and a vehicle controller is performed (S603).

Since operations S610, S620, S630, S640, and S650 are respectively similar to the operations S510, S520, S530, S540, and S550 shown in FIG. 5, descriptions thereof will be omitted.

After operations S635, S637, and S650, engine control is performed (S670). After the operation S670 is performed, the operation S610 is performed again.

Furthermore, the operations of the method or algorithm described in connection with the exemplary embodiments included herein may be implemented in a form of a program command which is executable through various computer means and may be recorded in a computer-readable medium. The computer-readable medium may include program (command) codes, data files, data structures, and the like in alone or a combination thereof.

The program (command) codes recorded in the computer-readable medium may be specially designed and configured for the exemplary embodiment or may be available to those skilled in the computer software. Examples of the computer-readable recording medium may include magnetic media such as a hard disk, a floppy disk, a magnetic tape, and the like, optical media such as a compact disc read only memory (CD-ROM), a digital versatile disc (DVD), a blu-ray disc, and the like, and semiconductor memory devices, which are configured to store and execute program (command) codes, such as a ROM, a RAM, a flash memory, and the like.

Here, examples of the program (command) codes include machine language codes generated by a compiler, as well as high-level language codes which are executable by a computer using an interpreter or the like. The above-described hardware devices may be configured to operate as one or more software modules to perform an operation of the present invention, and vice versa.

In accordance with various aspects of the present invention, there is an effect in that a wireless sensor network system may be constructed in an engine compartment, which may be used even under a harsh environmental condition, by removing a connector and/or a wire of a wireless sensor.

Furthermore, in accordance with various aspects of the present invention, there is another effect in that an existing layout and an existing control logic may be utilized by transferring a detected value as a value which is received by an existing ECU.

Furthermore, in accordance with various aspects of the present invention, there is yet another effect in that a complete wireless sensor network may be constructed by attaching a charging battery, which is self-powered, to the wireless sensor to remove a wire of the charging battery.

Moreover, in accordance with various aspects of the present invention, there is yet another effect in that extension of an engine wireless communication technique may be facilitated through wireless monitoring.

Furthermore, in accordance with various aspects of the present invention, there is yet another effect in that, since the wireless sensor is used, a development environment may extend without restriction of the number of pins of an ECU and/or the number of wires when a separate sensor is added.

Additionally, in accordance with various aspects of the present invention, there is yet another effect in that productivity may be improved by removing connectors and/or wires to reduce production cost, construction and design costs, increase a design space of an engine compartment, reduce a vehicle weight, increase fuel efficiency, and reduce the number of assembly processes.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A method of controlling communication restoration, the method comprising:
   a transmitting operation of transmitting, by one or more measurement sensors installed in an engine room of a vehicle, measured data, wherein the engine room is under environments of running;
   a receiving operation of receiving, by a vehicle controller connected to the one or more measurement sensors in a wireless communication manner, the measured data;
   a checking operation of checking, by the vehicle controller, whether the measured data is abnormal; and
   a restoring control operation of controlling restoration of a wireless communication connection between one of the one or more measurement sensors in which a wireless communication error with the vehicle controller occurs and the vehicle controller according to the checking result of whether the measured data is abnormal in order for the wireless communication connection to be usable even under harsh environment conditions in the engine room,
   wherein when the measured data is normal, the checking operation includes checking, by the vehicle controller, a number of times of communication deviance, and when the number of times of communication deviance is not present, the restoring control operation includes generating and storing, by the vehicle controller, a failure code of communication disturbance.

2. The method of claim 1, further comprising:
   before the transmitting operation, a self-charging operation of allowing the one or more measurement sensors to be self-charged by receiving power from a self-charged battery.

3. The method of claim 1, wherein, when the number of times of communication deviance is present, the restoring control operation further includes turning, by the vehicle controller, a warning lamp off.

4. The method of claim 1, wherein the checking operation further includes:
   when the measured data is abnormal, performing, by the vehicle controller, a repairing attempt with a corresponding measurement sensor in which the abnormality occurs among the one or more measurement sensors; and
   checking, by the vehicle controller, whether a data packet is abnormal according to the repairing attempt.

5. The method of claim 4, further comprising:
   when the data packet is abnormal, storing, by the vehicle controller, a failure code with respect to the corresponding measurement sensor.

6. The method of claim 4, further comprising;
   when the data packet is abnormal, turning, by the vehicle controller, a warning lamp on.

7. The method of claim 4, further comprising:
   when the data packet is normal, storing, by the vehicle controller, a failure code with respect to hardware related to an engine.

8. The method of claim 4, further comprising:
   generating, by the vehicle controller, counting information on a number of times of the repairing attempt.

9. A method of controlling communication restoration, the method comprising:
   a turning on operation of turning, by a vehicle controller, a warning lamp on upon starting;
   a pairing operation of pairing, by the vehicle controller, with one or more measurement sensors installed in an engine room of a vehicle, wherein the engine room is under environments of running;
   a transmitting operation of transmitting, by the one or more measurement sensors, measured data;
   a receiving operation of receiving, by the vehicle controller connected to the one or more measurement sensors, the measured data;
   a checking operation of checking, by the vehicle controller, whether the measured data is abnormal; and
   a restoring control operation of controlling restoration of a wireless communication connection between one of the one or more measurement sensors in which a wireless communication error with the vehicle controller occurs and the vehicle controller according to the checking result of whether the measured data is abnormal in order for the wireless communication connection to be usable even under harsh environment conditions in the engine room,
   wherein when the measured data is normal, the checking operation includes checking, by the vehicle controller, a number of times of communication deviance, and when the number of times of communication deviance is not present, the restoring control operation includes generating and storing, by the vehicle controller, a failure code of the communication disturbance.

* * * * *